(12) United States Patent
Mizak

(10) Patent No.: US 6,227,712 B1
(45) Date of Patent: May 8, 2001

(54) INTERNAL OIL FLOW PATH FOR GEAR BOX BEARINGS

(75) Inventor: Ronald D Mizak, Wadsworth, OH (US)

(73) Assignee: The Babcock & Wilcox Company, New Orleans, LA (US)

(*) Notice: Subject to any disclaimer, the term of this patent is extended or adjusted under 35 U.S.C. 154(b) by 0 days.

(21) Appl. No.: 09/009,366

(22) Filed: Jan. 20, 1998

(51) Int. Cl.[7] .................................................. F16C 19/00
(52) U.S. Cl. ............................................................ 384/474
(58) Field of Search ................................. 384/474, 475, 384/473, 462; 184/6.12, 11.2, 105.3

(56) References Cited

U.S. PATENT DOCUMENTS

| | | | |
|---|---|---|---|
| 3,763,961 | * | 10/1973 | Casale .................................. 184/11.2 |
| 4,541,738 | * | 9/1985 | Leibensperger et al. ......... 384/473 X |
| 4,700,808 | * | 10/1987 | Haentjens ........................ 184/11.2 X |
| 4,928,795 | * | 5/1990 | Maloney ............................... 384/474 |
| 4,976,233 | * | 12/1990 | Bedi et al. ..................... 184/105.3 X |
| 5,066,146 | * | 11/1991 | McDonner .......................... 384/473 |
| 5,074,380 | * | 12/1991 | Bedi et al. ..................... 184/105.3 X |
| 5,106,209 | * | 4/1992 | Atkinson et al. ..................... 384/475 |
| 5,107,718 | * | 4/1992 | Inagawa .......................... 184/6.12 X |
| 5,114,248 | * | 5/1992 | Harsdorff .............................. 384/473 |
| 5,168,844 | * | 12/1992 | Waelput .............................. 184/105.3 |
| 5,183,342 | * | 2/1993 | Daiber et al. ........................ 384/475 |
| 5,242,033 | * | 9/1993 | Toraason .............................. 184/6.12 |
| 5,253,733 | * | 10/1993 | Miyachi ........................... 384/474 X |
| 5,322,373 | * | 6/1994 | Oakes et al. ......................... 384/462 |
| 5,323,610 | * | 6/1994 | Fransson et al. ................ 384/473 X |
| 5,327,862 | * | 7/1994 | Bedi ..................................... 184/105.3 |
| 5,647,735 | * | 7/1997 | Rockwood ...................... 184/11.2 X |
| 5,699,877 | * | 12/1997 | Dreier ................................ 184/11.2 |
| 5,779,005 | * | 7/1998 | Jones, Jr. et al. ............... 384/473 X |

* cited by examiner

Primary Examiner—David A. Bucci
Assistant Examiner—Colby Hansen
(74) Attorney, Agent, or Firm—Robert J. Edwards; Daniel S. Kalka; Eric Marich

(57) ABSTRACT

An apparatus for modifying a gear casing used in coal pulverizer mills prevents lubricating oil leaks through worn O-rings by redirecting the oil in a different path which does not come into contact with the O-ring seals. An internal hose connection provides oil directly to a bearing top chamber through a passage in the bearing cartridge. A special connector is used to connect the internal hose to the passage. Several connector embodiments are disclosed.

21 Claims, 4 Drawing Sheets

INTERNAL OIL FLOW PATH FOR GEAR BOX BEARINGS

BACKGROUND OF THE INVENTION

1. Field of the Invention

The present invention relates generally to the field of coal pulverizer mills and in particular to lubrication of internal bearings located in a gear box of a coal pulverizer mill, especially a B&W MPS-type mill.

2. Description of the Related Art

Coal pulverizer mills are used to grind coal for combustion in industrial power plants. B&W's MPS-type mills are one type of coal pulverizer which have been used for approximately the past thirty years. The B&W MPS mills use a rotating grinding mechanism to crush coal chunks into finer particles for combustion.

The coal grinding mechanism is driven by an electric motor through a gear reducer contained in a gear casing. The bearings inside the gear casing must be lubricated to prevent lock-ups and excessive wear on the bearing surfaces. Lubricating oil is used for this purpose. However, oil leaks at two bearing locations in the gear casing are a recurring problem with these gear casings.

As seen in FIG. 1, a bearing casing 10 has several bearing positions, two of which are known as bearing position four 30 and bearing position five 20. The oil leaks which occur in these types of bearing casings 10 occur at bearing positions four and five 30, 20. FIG. 2 shows a prior art gear casing configuration of the bearing positions 20, 30 from the side and helps to explain how the oil leaks occur. Each bearing position 20, 30 has a bearing cartridge 28, 38 with an annular groove 26, 36 around its circumference. Oil is supplied to each groove 26, 36 through oil tube 40 located between the bearing positions 20, 30. Oil moves from the grooves 26, 36 through an opening in the bearing cartridges 28, 38 into bearing top chambers 22, 32 of each bearing position 20, 30, respectively. To prevent oil from leaking out the top of the gear casing 10, an O-ring 24, 34 is provided around the top of each bearing cartridge 28, 38 above the annular grooves. Unfortunately, over time these O-rings 24, 34 harden and lose their seal between the gear casing 10 and bearing cartridges 28, 38.

Conventionally, this oil leak problem has been solved by stopping oil flow to annular grooves 26, 36, redirecting the oil flow from a manifold 200 (not shown in FIG. 2) through a pair of external hoses, connected to covers 21, 31 and into bearing top chambers 22, 32. Several parts are required to effect this alteration to the oil flow path. This solution is not entirely satisfactory since external hoses present in an industrial setting, such as a power plant, are subject to being cut, corroded, crimped or otherwise damaged. Further, due to the complexity of the alteration of the oil flow path involved, it is not uncommon for the alteration to be made incorrectly, which can lead to continued oil leaks and failure of the bearings.

SUMMARY OF THE INVENTION

It is an object of the present invention to provide an improved oil flow path for gear casings of B&W MPS-type pulverizer mills which eliminates many of the disadvantages of the prior solution for preventing oil leaks.

It is a further object of the invention to provide an improved oil flow path which is simplified, located inside the gear casing and eliminates operating oil pressure against O-ring seals, thereby eliminating the possibility of leaks through these seals.

A further object of the invention is to make manufacture of bearing cartridges holding the gear shafts in place simpler by eliminating some machining on the bearing cartridges.

Accordingly, an improved oil flow path is provided through the gear casing of a B&W MPS-type pulverizer mill for the numbers 4 and 5 bearing positions. The improved flow path has bearing cartridges for each bearing position with passageways through the body for delivering oil from an internal supply hose and/or pipe to the bearing top chamber of each bearing position. A swivel fitting is connected to the bottom of each passageway for making the connection to the supply hose and/or pipe.

Alternatively, a simple block connector mounted to the bottom of each passageway may be used in place of the swivel fitting.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
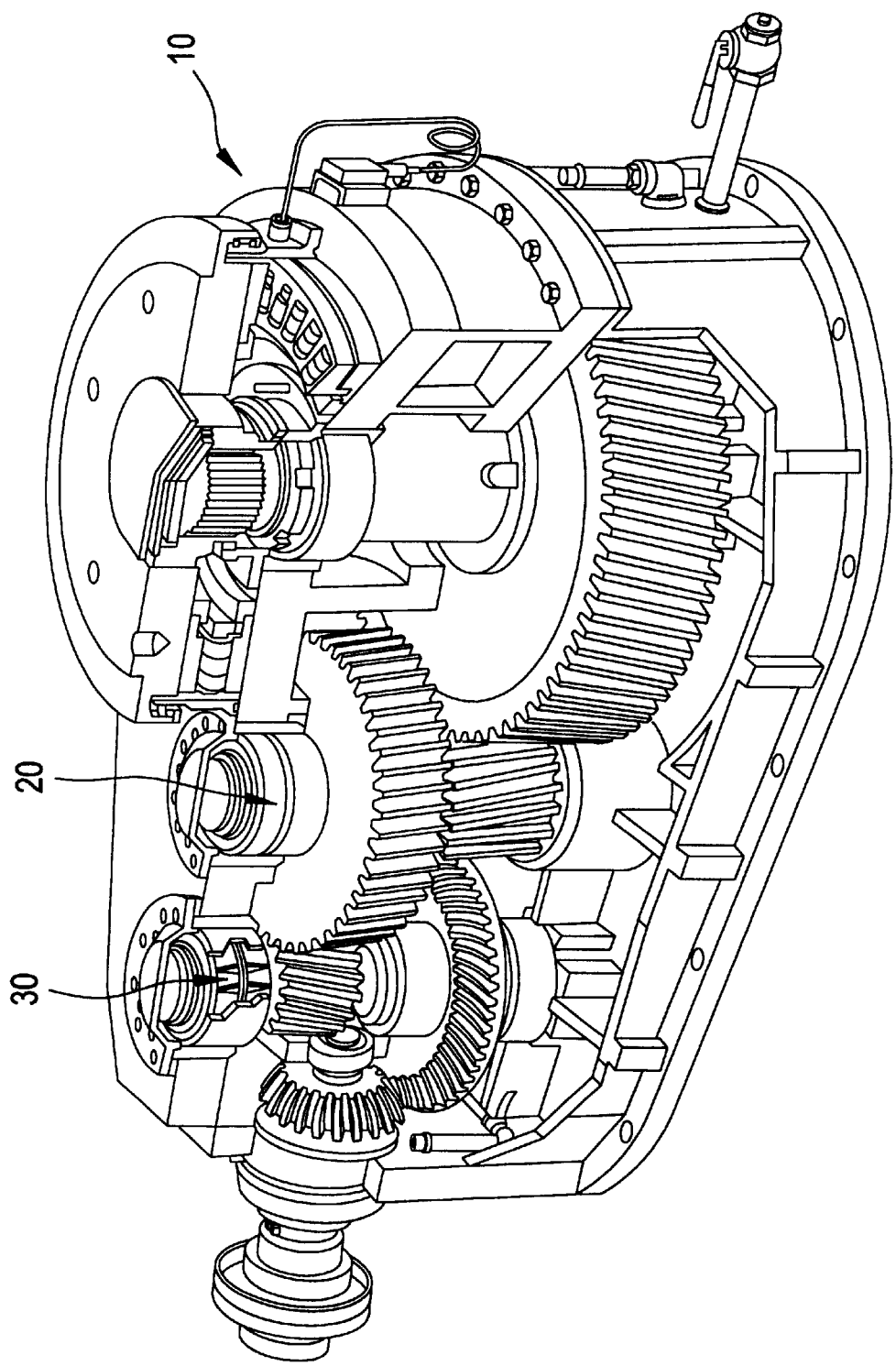
FIG. 1 is a sectional perspective view of a gear casing used in B&W MPS-type pulverizer mills.
Figure 2:
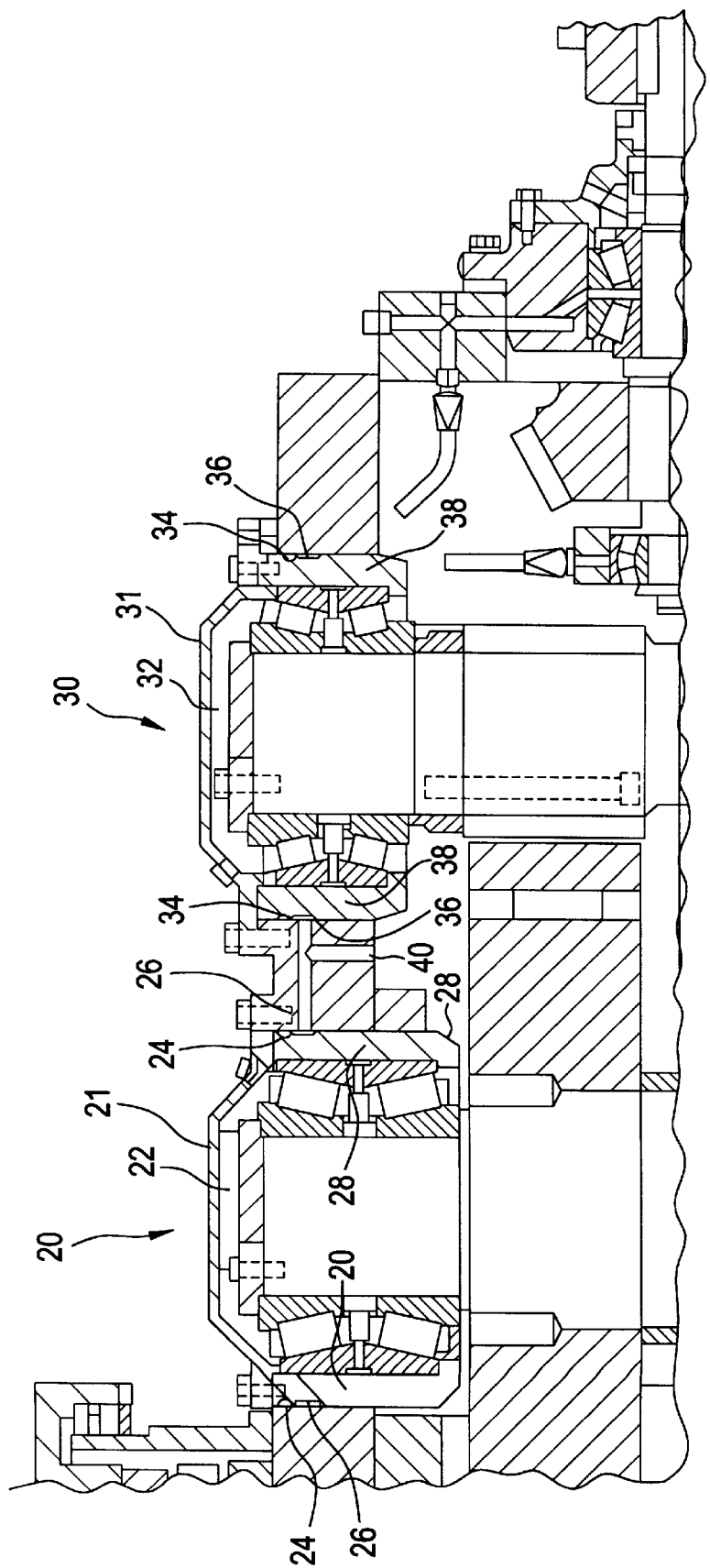
FIG. 2 is an enlarged sectional side elevational view of the number 4 and 5 bearing positions of a prior art configuration of the gear casing in FIG. 1.
Figure 3:
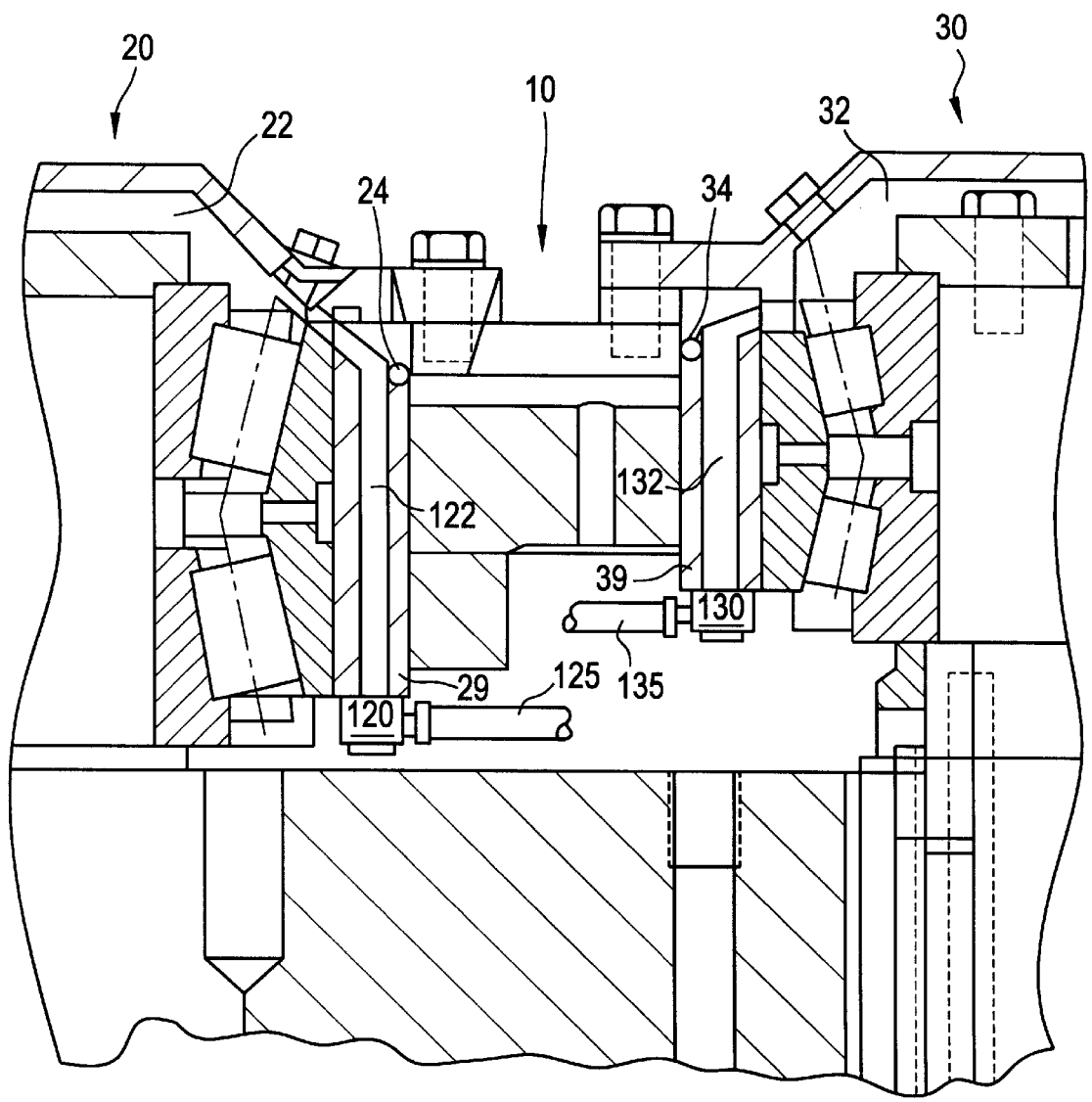
FIG. 3 is an enlarged sectional side elevational view of a portion of the number 4 and 5 bearing positions of the gear casing in FIG. 1 having the oil flow path of the present invention.

Referring now to the drawings in which like reference numerals are used to refer to the same or similar elements throughout the several views, FIG. 3 shows bearing positions four and five 20, 30 respectively, having an improved oil flow path to prevent leaks through the O-rings 24, 34. Each bearing position 20, 30 is provided with a bearing cartridge 29, 39 designed to improve the oil flow path in the bearing casing 10 by avoiding the O-rings 24, 34.

Bearing cartridges 29, 39 are provided with passages 122, 132 connecting the bottom edges of the bearing cartridges with the bearing top chambers 22, 32, respectively. Swivel connectors 120, 130 are mounted to the bottom edges of the bearing cartridges 29, 39 at the ends of the passages 122, 132. Swivel connectors 120, 130 are used to attach oil supply hoses and/or pipes, such as hoses 125, 135 shown in FIG. 3, to the passages 122, 132. Hoses 125, 135 may be connected to a manifold 200 (not shown in FIG. 3).

At time of assembly and disassembly, the sub-assemblies consisting of bearing cartridges 29, 30, swivel connectors 120, 130 and hoses 125, 135, must be able to pass through bores in casing 10. To accomplish this feature, the swivel connectors 120, 130 and hoses 125, 135 are turned inward to create an envelope equal to or smaller than the outside diameter of bearing cartridge 29, 39. Once each subassembly passes through the bores in casing 10, each swivel connector 120, 130, with attached hoses 125, 135 are turned outward to facilitate assembly.

The swivel connectors 120, 130 provided at the bottom ends of bearing cartridges 29, 39 permit oil to pass from the manifold 200 through the respective hoses 125, 135, swivel connectors 120, 130 and passages 122, 132 into each of the top chambers 22, 32, where the oil is used to lubricate the bearing. At no time does the oil being conveyed on this path contact the outside of the bearing cartridges 29, 39 or O-rings. Thus, pressure against the O-rings 24, 34 is reduced, thereby reducing wear on the O-rings 24, 34 and the lack of pressure prevents leaks occurring through the O-ring seals.

Several alternate embodiments for the swivel connectors 120, 130 and hoses 125, 135 are envisioned. FIGS. 4–7 display four alternate connections which could be used to provide a path from the manifold 200 to the passages 122, 132. In order to simplify the description of each embodiment, only the bottom portion of one bearing cartridge 29 is shown in each figure, although the same or a different embodiment may easily be used on the second bearing cartridge 39. The remainder of the bearing cartridge 39 which is not shown in these four figures is the same as that of FIG. 3 in each case, except as noted.

Figure 4:
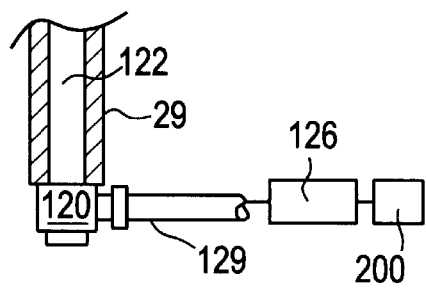
FIG. 4 is an alternate embodiment of the oil flow path shown in FIG. 3.

FIG. 4 displays an embodiment of the connector in which a swivel connector 120 has a pipe connector 129 which is used to attach a flexible supply hose 126 connected to the manifold 200.

Figure 5:
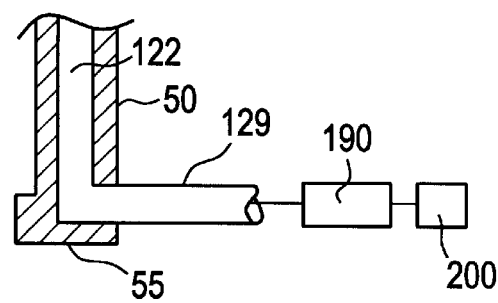
FIG. 5 is a third embodiment of the oil flow path shown in FIG. 3.

FIG. 5 has a bearing cartridge 50 with a supporting ledge 55 for supporting a pipe 129 connecting the passage 122 to the manifold 200. The supporting ledge 55 extends from the inner side of the bearing cartridge 50 underneath the passage 122, thereby creating a substantially right-angle bend at the bottom end of the bearing cartridge 50. A flexible hose 190 may be attached to the pipe 129 at any convenient point to place the pipe 129 in communication with the manifold 200.

Figure 6:
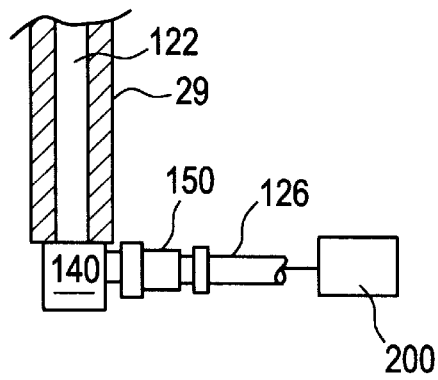
FIG. 6 is a fourth embodiment of the oil flow path shown in FIG. 3.

In the embodiment of FIG. 6, the swivel connector 120 is replaced by a stationary block 140 which may be bolted to the bearing cartridge 29. A hose connector 150 attached to the block 140 provides a fitting for a flexible hose 126 connected to the manifold 200.

Figure 7:
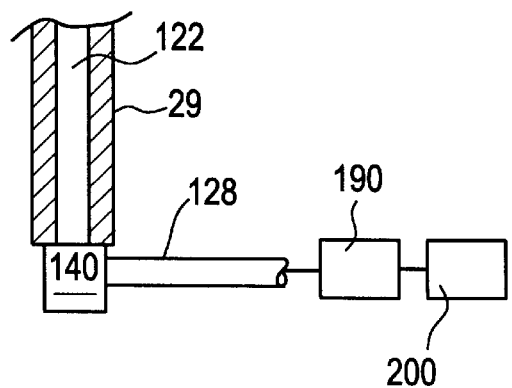
FIG. 7 is a fifth embodiment of the oil flow path shown in FIG. 3.

Finally, in FIG. 7, the stationary block 140 may be used to support a pipe 128 connected between the passage 122 and the manifold 200. A flexible hose 190 may connect the pipe 128 to the manifold 200.

It is envisioned that the swivel connectors 120, 130 may be mounted to the ends of the passages 122, 132 in any known manner which permits oil to flow through the connectors 120, 130 into the passages 122, 132. Each swivel connector 120, 130 or block 140 must be sized appropriately for the limited space available adjacent the bearing cartridges 29, 39 inside the gear casing 10 as well.

The improved bearing positions 20, 30 permit the oil path to be kept entirely within the casing 10, thus reducing the likelihood of oil leaks or external forces causing failures of the oil supply lines. Further, the apparatus required to implement this oil path is relatively simple, with fewer parts, easier assembly and, therefore, less likelihood of incorrect implementation in existing bearing positions.

While a specific embodiment of the invention has been shown and described in detail to illustrate the application of the principles of the invention, it will be understood that the invention may be embodied otherwise without departing from such principles.

I claim:

1. A gear casing for a pulverizer mill having a bearing located therein having a redirected oil flow path for internally lubricating the gear casing to prevent oil leaks from the gear casing at the bearing, comprising:

a bearing cartridge for said bearing having inner and outer walls and a bottom edge, the outer wall being substantially smooth and linear;

a passage extending through the bearing cartridge and being located between the inner and outer walls and connecting a bearing top chamber above said bean and the bottom edge of the bearing cartridge;

an oil manifold located outside said gear casing for supplying oil flow; and connector means for joining the passage at the bottom edge of the bearing cartridge to said oil manifold to allow oil flow to the top chamber of said bearing cartridge.

2. A gear casing according to claim 1, wherein the connector means comprises a swivel connector located within said gear casing and attached to the bottom edge in communication with the passage at one end and connected to said manifold at the other end.

3. A gear casing according to claim 2, wherein the swivel connector is connected to said manifold by a flexible hose.

4. A gear casing according to claim 3, wherein the swivel connector is connected to the manifold by a section of pipe.

5. A gear casing according to claim 1, wherein the connector means comprises a section of pipe in communication with the passage adjacent the bottom edge of the bearing cartridge.

6. A gear casing according to claim 5, wherein the bearing cartridge further comprises a supporting ledge extending underneath the end of the passage at the bottom edge, the pipe resting on at least a portion of the supporting ledge.

7. A gear casing according to claim 1, wherein the connector means comprises a block bolted to the bottom edge of the bearing cartridge, the block having a path therethrough in communication with the passage and connected to the manifold.

8. A gear casing according to claim 7, wherein the block is connected to the manifold by a section of pipe.

9. A gear casing according to claim 7, wherein the block is connected to the manifold by a flexible hose.

10. A gear casing for a pulverizer mill according to claim 1 including an O-ring seal for sealing said bearing top chamber to said bearing cartridge.

11. A gear casing for a pulverizer mill according to claim 10 wherein said ring seal is located at said outer wall of said bearing cartridge with no communication with said passage through said bearing cartridge and the oil flowing from said manifold to said top chamber.

12. A bearing for use in a gear casing for providing a lubricant to the bearing located internally to the gear casing having reduced oil leaking comprising;

a bearing cartridge for the bearing having inner and outer walls and a bottom edge, the outer wall being substantially smooth and linear, the bearing cartridge having sealing means for forming a seal between the outer wall of the bearing cartridge and the gear casing;

a passage through the bearing cartridge located between the inner and outer walls and connecting a bearing top chamber above the bearing and the bottom edge of the bearing cartridge;

a manifold for supplying continuous oil flow; and connector means for joining the passage at the bottom edge of the bearing cartridge to said oil manifold to allow oil flow to the top chamber of said bearing cartridge.

13. A bearing according to claim 12, wherein the connector means comprises a swivel connector attached to the bottom edge in communication with the passage at one end and connected to the manifold at the other end.

14. A bearing according to claim 13, wherein the swivel connector is connected to the manifold by a flexible hose.

15. A bearing according to claim 14, wherein the swivel connector is connected to the manifold by a section of pipe.

16. A bearing according to claim 12, wherein the connector means comprises a section of pipe in communication with the passage adjacent the bottom edge of the bearing cartridge.

17. A bearing according to claim 16, wherein the bearing cartridge further comprises a supporting ledge extending underneath the end of the passage at the bottom edge, the pipe resting on at least a portion of the supporting ledge.

18. A bearing according to claim 12, wherein the connector means comprises a block bolted to the bottom edge of the bearing cartridge, the block having a path therethrough in communication with the passage and connected to the manifold.

19. A bearing according to claim 18, wherein the block is connected to the manifold by a section of pipe.

20. A bearing according to claim 18, wherein the block is connected to the manifold by a flexible hose.

21. A bearing according to claim 12 wherein said sealing means is an O-ring mounted on said outer wall of said cartridge having no communication with said passage through said cartridge wall.

* * * * *